(12) United States Patent
Mawby et al.

(10) Patent No.: US 9,120,280 B2
(45) Date of Patent: Sep. 1, 2015

(54) TIRE UNIFORMITY THROUGH IDENTIFICATION OF PROCESS SIGNATURES

(75) Inventors: William David Mawby, Greenville, SC (US); Jimmy Jeter, Simpsonville, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 19 days.

(21) Appl. No.: 13/262,969

(22) PCT Filed: Apr. 29, 2010

(86) PCT No.: PCT/US2010/032883
§ 371 (c)(1), (2), (4) Date: Oct. 5, 2011

(87) PCT Pub. No.: WO2010/127061
PCT Pub. Date: Nov. 4, 2010

(65) Prior Publication Data
US 2012/0035757 A1    Feb. 9, 2012

(51) Int. Cl.
*G06F 19/00* (2011.01)
*B29D 30/06* (2006.01)

(52) U.S. Cl.
CPC .... *B29D 30/0633* (2013.01); *B29D 2030/0635* (2013.01)

(58) Field of Classification Search
CPC .................................................. A43D 119/00
USPC .............................. 700/105; 156/111; 73/146
See application file for complete search history.

(56) References Cited

U.S. PATENT DOCUMENTS

| 7,069,135 B2 | 6/2006 | Bertrand |
| 7,213,451 B2 | 5/2007 | Zhu et al. |

(Continued)

FOREIGN PATENT DOCUMENTS

| EP | 1 600 758 B1 | 11/2005 |
| EP | 1 697 115 B1 | 1/2008 |
| WO | WO 2005/051640 | 6/2005 |

OTHER PUBLICATIONS

PCT International Search Report for PCT/US09/0542350, dated Jun. 19, 2009.

(Continued)

*Primary Examiner* — Robert Fennema
*Assistant Examiner* — Anthony Whittington
(74) *Attorney, Agent, or Firm* — Dority & Manning

(57) ABSTRACT

A system and related method for improving tire uniformity includes providing a number (n) of test tires manufactured in a known order and identifying at least one candidate cyclic process effect with a corresponding frequency of introduction (f). A given uniformity parameter, such as radial or lateral run-out, balance, mass variation, radial lateral or tangential force variation, is measured for each tire in the test set, and measured data points are combined into a concatenated composite waveform. At least one process harmonic associated with each identified cyclic process effect is separated from the tire harmonics, for example, by Fourier transformation with identification of the process harmonics as positive integer multiples of the mth harmonic of the measured uniformity parameter where $m=n/f$. Once the process harmonics are extracted, filtered uniformity measurements can be provided or new tires can be built with the process effect minimized.

20 Claims, 10 Drawing Sheets

(56) References Cited

U.S. PATENT DOCUMENTS

| | | | |
|---|---|---|---|
| 7,240,542 B2 | 7/2007 | Gustafsson et al. | |
| 7,468,661 B2 | 12/2008 | Petite et al. | |
| 2004/0068342 A1* | 4/2004 | Bedont et al. | 700/182 |
| 2005/0262933 A1* | 12/2005 | Zhu et al. | 73/146 |
| 2006/0086451 A1* | 4/2006 | Nakata | 156/111 |
| 2006/0137802 A1* | 6/2006 | Flament et al. | 156/110.1 |
| 2006/0169392 A1* | 8/2006 | Akiyama et al. | 156/111 |
| 2007/0000594 A1 | 1/2007 | Mawby et al. | |
| 2007/0137764 A1* | 6/2007 | Sawada et al. | 156/131 |
| 2007/0145623 A1* | 6/2007 | Hair | 264/40.1 |
| 2009/0145216 A1* | 6/2009 | Huang et al. | 73/146.5 |

OTHER PUBLICATIONS

PCT International Search Report for PCT/US10/032883, dated Jul. 21, 2010.

Thomas D. Gillespie, "Performance Evaluation of the UMTRI Tire/Wheel Uniformity Test Machine," Jun. 1986; The University of Michigan Transportation Research Institute.

G. Larry Bretthorst, "Lecture Notes in Statistics-Bayesian Spectrum Analysis and Parameter Estimation," 1988; Germany.

Supplementary European Search Report for EP 10 77 0303, dated Aug. 21, 2012.

* cited by examiner

US 9,120,280 B2

TIRE UNIFORMITY THROUGH IDENTIFICATION OF PROCESS SIGNATURES

PRIORITY STATEMENT

The present application is a 371 of PCT/US2010/328823 filed Apr. 29, 2010 which claims the benefit of priority of PCT/US2009/042350 filed Apr. 30, 2009.

FIELD OF THE INVENTION

The invention relates to tire uniformity, and more specifically to a method for analyzing and controlling the uniformity of tires during and after tire manufacturing.

BACKGROUND OF THE INVENTION

Tire non-uniformity relates to the symmetry (or lack of symmetry) relative to the tire's axis of rotation in mass, geometric or stiffness characteristics. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis. The obtained measurements can generally include a composite waveform representative of tire uniformity, which can be decomposed into many respective harmonic contributions.

The respective tire harmonics obtained from a measured uniformity waveform can be analyzed in accordance with known processing techniques in order to improve uniformity. One example of improving uniformity is implemented by altering the relative angular position of known manufacturing components in a tire to reduce the magnitude of the measured uniformity parameter for one or more tire harmonics of interest. However, this type of uniformity analysis may be hindered by the impact of process effects whose periodic contributions to the composite uniformity waveform are not identical to the tire harmonics, resulting in poorer compensations and adjustments.

The present disclosure provides new techniques that help identify different causes of uniformity, including those due to cyclic elements in the tire manufacturing process whose effects are not identical in wavelength to any particular tire harmonic. Identification of such uniformity contributions can help improve uniformity analysis as well as the tire building process. Although known technologies for tire uniformity improvement have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved system and methodology has been provided to improve uniformity in tires. Such methodology generally involves constructing and providing one or more sets of test tires manufactured in some known order, modeling and analyzing measured parameter(s) associated with the test tires (including the uniformity contributions from tire harmonics versus process harmonics), and building improved tires based on such analysis.

The test tires, even when manufactured under like conditions, are subject to uniformity dispersion due to both tire effects (i.e., variations that manifest themselves as harmonic components of a uniformity measurement that have a period that fits some integral number of times within one tire circumference) as well as process effects (i.e., hidden or neglected periodic effects that do not have periods that fit an integral number of times within one tire circumference.) Examples of tire effects include those due to tire material components (e.g., the product start point or joint overlap location of one or more of casing textile plies, belt plies, bead rings, inner liner, tread and other rubber layers of the tires), manufacturing techniques (e.g., the relative location in which a green tire is introduced on a building drum, placed into a mold or curing press, and the like), and/or controllable conditions used in the tire construction process (e.g., the temperature and pressure at which green tires are subjected during the curing process or other manufacturing steps.) Examples of process harmonics may arise from such manufacturing conditions as a roller influence, extruder surge, fluctuation in a process condition (e.g., temperature, pressure, speed, etc.) and others. It is usually desirable to know the relative angular location within each tire of certain tire effects as well as the frequency of introduction (f) of a process effect across multiple tires.

The subject technology also involves obtaining measured information about the test tires. For example, at least one uniformity parameter for at least one harmonic of interest may be determined. Such uniformity parameters may selectively include one or more of radial run out (RRO), lateral run out (LRO), balance, mass variance, radial force variation (RFV), lateral force variation (LFV) and tangential force variation (TFV). This measured data is obtained for multiple tires manufactured in known order such that the data for multiple tires is combined into a concatenated composite waveform which is subsequently analyzed in its entirety as opposed to separately for each tire. In some embodiments, it is desirable to provide data for a number of tires (n) such that n/f equals a positive integer number.

In one exemplary method, analysis of the concatenated composite waveform separates harmonics associated with each candidate cyclic process effect (i.e., process harmonics) from harmonics associated with the tire effects (i.e., tire harmonics). Such extraction can occur by applying either a Fourier transformation or regression-based analysis to the data points forming the concatenated composite waveform. In one embodiment, harmonics due to a particular process effect can be identified as integer multiples of the $m^{th}$ harmonic of the measured uniformity parameter, where m=n/f.

Once the process harmonics are separated from the tire harmonics, new tires can be built to improve uniformity based on such knowledge. For example, angular locations of material components contributing to tire effects can be altered relative to the location of a process effect (which may be tracked through multiple tires using a sensor) so that the combined average magnitude of the tire and process effects is reduced. In addition, separation of the process harmonic(s) can also be used to provide filtered uniformity measurements focusing just on the tire harmonics. In this way, the angular location of components contributing to tire harmonies can be optimized without the process effects interfering with such optimization.

In addition to various methodologies, it is to be understood that the present subject matter equally relates to associated systems, including various hardware and/or software components that may be provided in a tire manufacturing and measurement system. In one exemplary embodiment, the present subject matter concerns a system for improving the uniformity of tires, including manufacturing components as well as modeling components.

The manufacturing components are part of a tire construction system that builds tires in accordance with known techniques such that one or more process elements are positioned in accordance with particular angular locations relative to a reference point on each tire. The fixed location of each tire effect is known within tires, and the changing location of each process effect as it is periodically introduced over a plurality of tires is tracked (e.g., using a sensor). This knowledge of effect location and frequency of introduction helps facilitate improvements in the tire building process. Information related to such improvements can be either provided as a displayed output to a user or fed back in a control loop to the manufacturing process such that the improved process element locations can be implemented in subsequent tire construction.

In one exemplary embodiment, modeling/processing components of the tire measurement system include a first memory/media element adapted for storing a plurality of concatenated data points for one or more measured uniformity parameters for a set of test tire manufactured in a known order. A second memory/media element is adapted for storing software in the form of computer-executable instructions. At least one processor is coupled to the first and second memories and configured to selectively implement the computer-executable instructions stored in the second memory to process the measurements and other data stored in the first memory. A third memory/media element may also be provided for storing output data to provide to a user or for subsequent processing or feedback control.

In a particular embodiment of the above tire measurement system, the one or more processors implement the computer-executable instructions stored in memory in order to separate a process harmonic associated with at least one candidate cyclic process effect having an identified frequency of introduction from tire harmonics in a composite waveform formed from the plurality of concatenated data points measured and stored in the first memory. As previously mentioned, such separation may be implemented by applying either a Fourier transformation or regression-based analysis to the data points forming the concatenated composite waveform. In one embodiment when (d) data points are measured for each of (n) tires in a test set, process harmonics can be identified as integer multiples of the $m^{th}$ harmonic of the measured uniformity parameter, where m=n/f, and tire harmonics correspond to the $(j*n)^{th}$ harmonics for j=1, 2, ..., d/2.

It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1A:
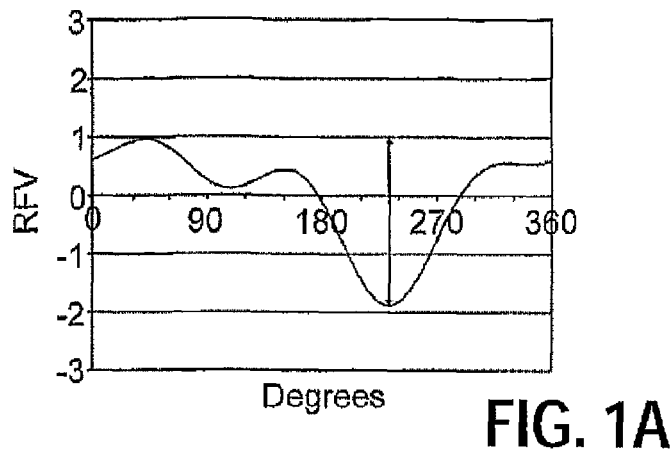
FIGS. 1A through 1C, respectively, depict schematic representations of a uniformity measurement of the radial force variation of a tire showing the original composite waveform as well as respective first and second harmonic components.

Repeat use of reference characters throughout the present specification and appended drawings is intended to represent same or analogous features, elements or steps of the present invention.

DETAILED DESCRIPTION OF THE PREFERRED EMBODIMENTS

As discussed above, the present subject matter is particularly concerned with a system and method for improving tire uniformity by identifying different causes of uniformity, including those due to cyclic elements in the tire manufacturing process whose effects are not identical in wavelength to any particular tire harmonic. Identification of such uniformity contributions can help improve uniformity analysis as well as the tire building process.

In analyzing tire uniformity, a variety of different uniformity parameters may be measured. Examples of such uniformity parameters may include but are not limited to one or more of the following: radial run out (RRO), lateral run out (LRO), mass variance, balance, radial force variation (RFV), lateral force variation (LFV) and tangential force variation (TFV). When one of such parameters is measured in accordance with uniformity analysis, the parameter is usually measured at a number of data points around a tire as the tire is rotated about its axis. The obtained measurements generally correspond to a composite waveform representative of tire uniformity, which can be decomposed into many respective harmonic contributions.

As an example, consider that it is desired to measure and analyze the radial force variation (RFV) for a given set of test tires. FIG. 1A shows a schematic of the measured RFV for a cured tire. The abscissa represents the circumference of the tire and the ordinate the radial force variations. FIG. 1A is the as-measured signal and is referred to as a composite waveform. The composite waveform may comprise a large number of combined harmonics. The individual harmonics may be obtained by applying Fourier decomposition to the composite signal.

Figure 1B:
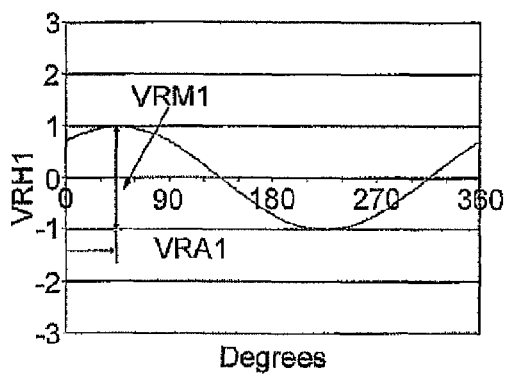
Figure 1B:
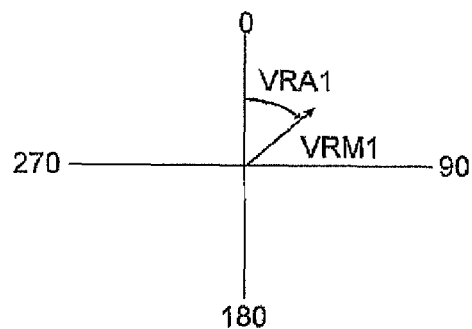
Figure 1C:
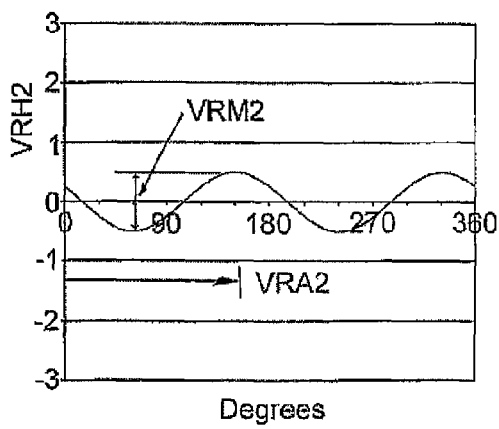
Figure 1C:
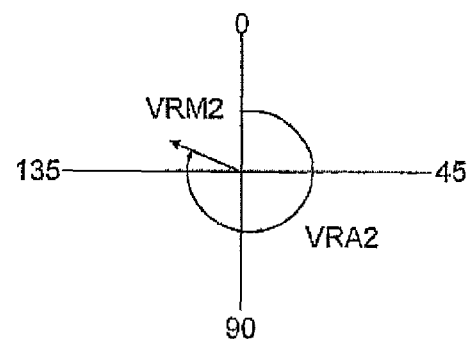

FIGS. 1B and 1C depict the resulting first and second harmonics (VRH1 and VRH2), respectively, extracted from the composite signal. The magnitude of the first harmonic of radial force VRM1 is defined as the difference between the maximum and minimum force. The phase angle or azimuth of the first harmonic VRA1 is defined as the angular offset between the reference location for the measurement and the location of maximum radial force. Thus, the sine wave depicted by Cartesian coordinates in FIG. 1B can be equally shown as a vector in the polar coordinate scheme. Such a vector plot is shown in FIG. 1C immediately to the right of the sine wave plot. The RFV vector of the first harmonic VRH1 has a length equal to VRM1 and is rotated at an angle equal to the azimuth VRA1. In a similar manner, one can extract the second harmonic vector VRH2 shown in FIG. 1C that has a force magnitude VRM2 and an azimuth VRA2. The corresponding polar plot for the H2 vector resembles the H1 vector, except that the angular coordinate is now two times the azimuth angle.

In analyzing the above tire harmonics, it is significant to note that there will be some variation in the decomposed harmonic vectors, even when tires are built under seemingly identical process conditions. This can be seen by obtaining a population of uniformity vectors by measuring and decomposing the uniformity harmonics for a plurality of test tires. Such a population of vectors can then be averaged to obtain a mean vector representative of the average uniformity value for a population of tires.

Figure 2:
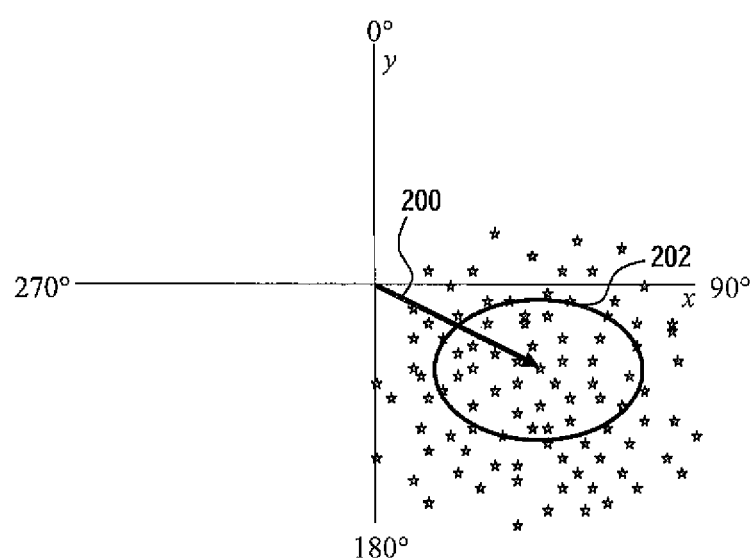
FIG. 2 is a vector plot of a data set of an exemplary measured uniformity parameter for multiple respective tires, including an average vector and dispersion area resulting from the measured data set.

For example, consider FIG. 2 which shows a population of measurement vectors, where each star in the drawing represents a measurement obtained for a different tire. The magnitude of each vector is the distance the star is from the origin, and the azimuth is the angle from the x-axis (0°). The mean, or average, vector of the population of VRH1 vectors shown in FIG. 2 is represented by the ray 200 starting at the origin and extending outwards at an angular position of about 130°. Dispersion is represented as the scatter of the individual tire vectors around the average vector 200. One way to mathematically represent the amount of scatter of the individual vectors is by the area of the standard ellipse, shown as area 202 in FIG. 2.

The sources of the dispersion represented by the scatter in FIG. 2 can come from many different sources. Some sources of uniformity dispersion stem from variations in the material components that are used in construction of a tire (e.g., different product start points or joint overlap locations of layered materials such as but not limited to textile plies, bead rings, inner liners, tread portions and other rubber layers that are combined to form the tire carcass, belt and summit portions), differences in manufacturing techniques that are used in tire construction (e.g., the relative location in which a tire is loaded into a curing press), and even variations in controllable conditions such as temperature and pressure that affect the tire building process. Most of the above types of variations will usually show themselves as so-called "tire harmonics," meaning that such variations will correspond to harmonic components of a uniformity measurement that have a period that fits some integral number of times within one tire circumference.

Figure 3:
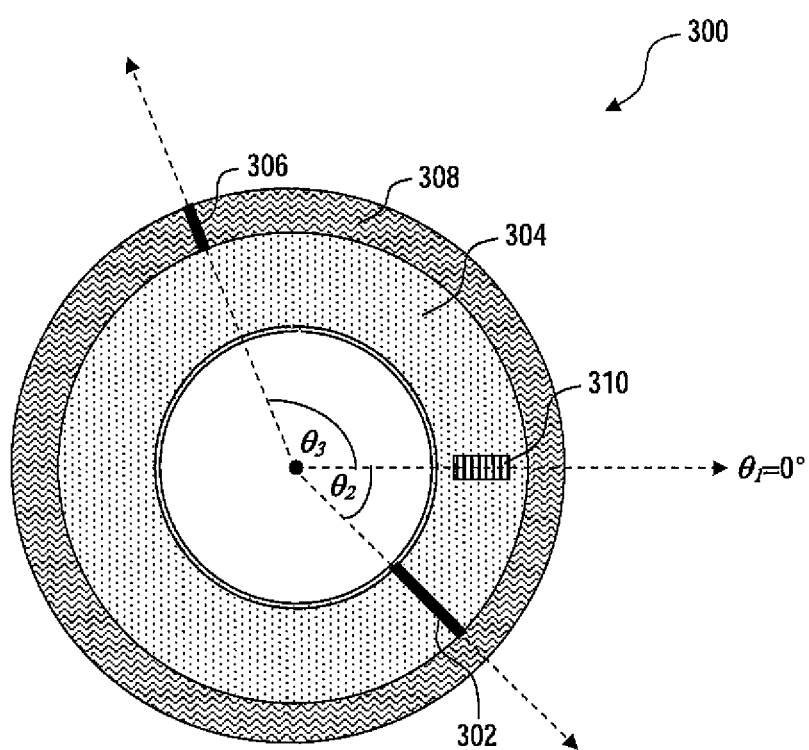
FIG. 3 provides a component representation of an exemplary tire and corresponding process elements which might contribute to tire harmonics and whose angular locations might be optimized to compensate for process harmonic effects in accordance with aspects of the present invention.

An example of tire manufacturing components that present themselves as tire harmonics in a uniformity measurement is illustrated in FIG. 3. In particular, the process elements that contribute tire harmonics to a uniformity measurement taken relative to tire 300 include joint 302 of first tire layer 304 and joint 306 of second tire layer 308. The relative locations of the joints 302 and 306 (i.e., $\theta_2$ and $\theta_3$, respectively) are usually known relative to some visual reference point on the tire, for example bar code 310 located at $\theta_1 = 0°$. If tires are attempted to be manufactured under similar conditions, then each of the multiple tires in a batch of constructed tires would have one uniformity contribution from each joint 302 and 306 for each single tire rotation. As such, these uniformity contributions would be considered tire harmonics. However, not all uniformity contributions are consistently introduced once per tire circumference.

Another source of the dispersion represented by the scatter in FIG. 2 can stem from hidden or neglected periodic effects, but now, these effects are associated with process effects that are not necessarily matched to tire harmonics. That is, these process effects are still periodic in nature, but they do not have periods that fit an integral number of times within one tire circumference. One may say that they are harmonics of the process rather than harmonics of the tire. As such, tire variations stemming from known or unknown contributions due to the manufacturing process are referred to herein as "process harmonics."

Figure 4A:
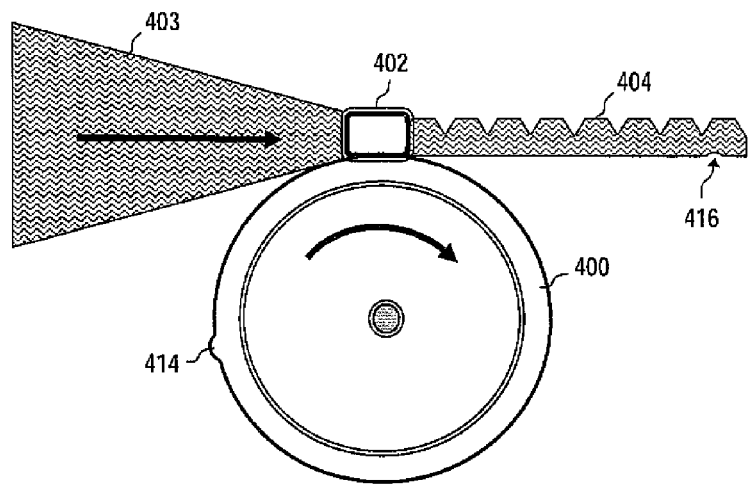
FIG. 4A provides a schematic representation of exemplary tread building components, including an out-of-round roller that periodically imparts a process effect into consecutively built tires.
Figure 4B:
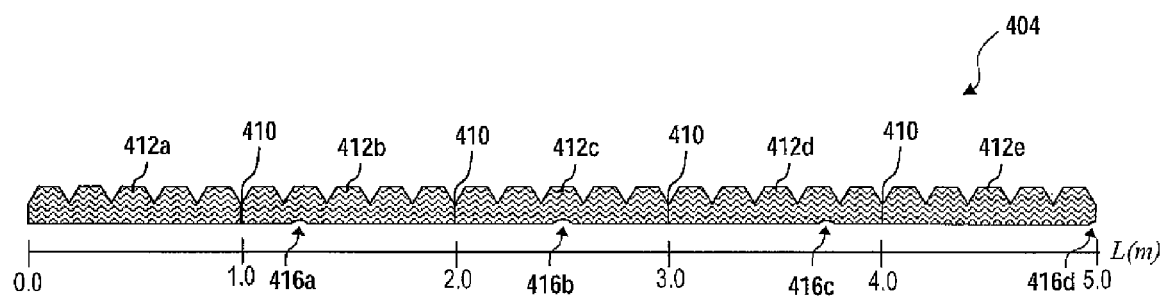
FIG. 4B depicts schematically a tread layer with periodically introduced process effects that would be imparted into five exemplary consecutively built tires, where the abscissa in such schematic represents the length (L) in meters (in) of the tread layer.

Examples of process harmonics may arise from such manufacturing conditions as a roller influence, extruder surge, fluctuation in a process condition (e.g., temperature, pressure, speed, etc.) and others. A specific example representing the contribution of a process harmonic due to an out-of-round roller condition is depicted in FIGS. 4A and 4B. Consider roller 400 and extruder 402 which are positioned next to one another and function together to form a particular layer for use in constructing tires. In one example, rubber 403 is fed into extruder 402 and formed along roller 400 such that a continuous band of tread portion 404 is created. This elongated tread portion 404 is eventually cut into different portions which are used to construct the respective tread layers of a series of manufactured tires.

Referring more particularly to FIG. 4B, consider tread portion 404 with length (L) measured in meters (m) being used to form the tread layers in five consecutively manufactured tires, each having a tread circumference of about 1.0 meter. As such, tread portion 404 will be cut at respective locations 410 to create tread sections 412a, 412b, 412c, 412d and 412e, each characterized by a length of about one meter. Now consider that the roller from FIG. 4A had an out-of-round condition 414 that imparted a slight variation 416 to the tread portion 404 every 1.25 meters. This process effect would thus show up periodically in the series of consecutively cut tread sections.

For example, consider a first introduction 416a of process effect due to roller condition 414 being located at 1.25 meters, which is 1.25 meters from the beginning of tread section 412a and 0.25 meters from the beginning of tread section 412b. The second introduction 416b of the process effect due to roller condition 414 would then be located at 2.5 meters, which is 0.5 meters from the beginning of tread section 412c. The third introduction 416c of the process effect due to roller condition 414 would be located at 3.75 meters, which is 0.75 meters from the beginning of tread section 412d. The fourth introduction 416d of the process effect due to roller condition 414 would be located at 5.0 meters, which is at the end of tread section 412e. Although only five consecutive tread portions are shown in FIG. 4B, this periodically repeating trend of the roller process effect continues through additional tires in a consecutively manufactured series.

It is clear from the location of the particular process effect identified in FIGS. 4A and 4B that the effect is not located in the same position, if at all, in every tire. Since such effect does not consistently show itself once per tire circumference (e.g., once every 1.0 meters), it will not be considered a so-called "tire harmonic" but instead a "process harmonic" having a different frequency of introduction relative to the circumference of manufactured tires (e.g., once every 1.25 meters).

Figure 5:
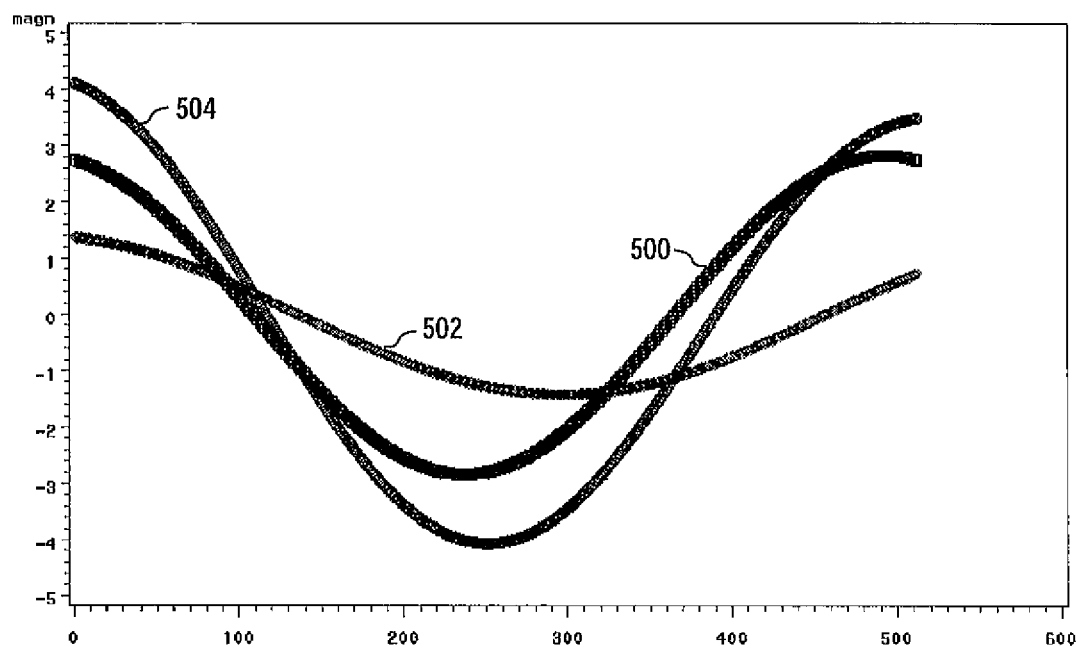
FIG. 5 is a graphical representation depicting the different contributions of both tire harmonics and process harmonics to an exemplary uniformity measurement, where the ordinate represents the magnitude (magn) of the uniformity measurement measured in kilograms force (kgf) and the abscissa represents the data point index (i) as measured around a tire circumference.

Referring now to FIG. 5, a graphical representation shows the different contributions of both tire harmonics and process harmonics to an exemplary uniformity measurement. Consider an example in which there are two strong tire $1^{st}$ harmonics due to different components, for example joint locations 302 and 306 from FIG. 3. If a uniformity waveform was only affected by such tire harmonics, it might look like waveform 500 in FIG. 5. But, now consider that there is a roller effect that occurs with a frequency of 1.25 times the tire circumference and that also contributes to the uniformity waveform. Such a process harmonic is represented as waveform 502. An actual measured waveform that would include both the tire and process harmonics would appear as waveform 504, a resultant combination of both waveforms 500 and 502. In comparing waveforms 500 and 504, the true tire curve is distorted by the roller process effect, and would have a higher apparent $1^{st}$ harmonic magnitude as a result.

Exemplary embodiments of the present invention provide a way to improve tire uniformity by extracting the contribution from so-called process effects. Identification of such process effects can be used to filter uniformity measurements and/or correct various aspects of the manufacturing process. An example of possible steps to implement such a method is shown in FIG. 6.

Figure 6:
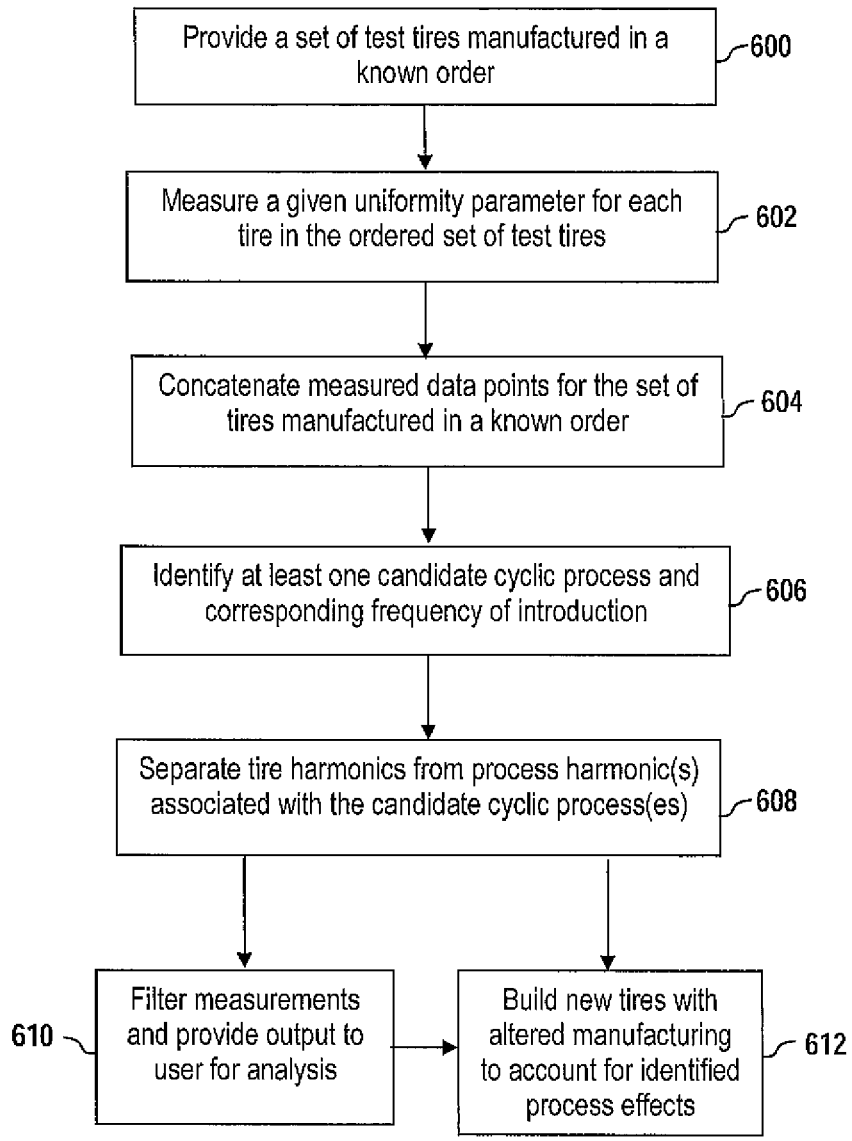
FIG. 6 provides a flow chart of exemplary steps and features in a method of improving tire uniformity through evaluation of process signatures.

Referring now to FIG. 6, a first step 600 includes providing a set of test tires for which the manufacturing order is known. The set of test tires should be in some known order so that the contribution from a process effect shows itself in some periodic fashion when analyzing multiple tires.

Referring still to FIG. 6, at least one additional step 602 is directed to obtaining certain uniformity measurements for the test tires. In particular, exemplary step 602 involves measuring a given uniformity parameter for a set of test tires for which the manufacturing order is known. In step 602, the measured parameter may correspond, for example, to such uniformity parameters as radial run out (RRO), lateral run out (LRO), mass variance, balance, radial force variation (RFV), lateral force variation (LFV) and tangential force variation (TFV). Examples that discuss selected ones of the above parameters are presented herein for illustrative purposes only and should not be unnecessarily limiting to the present invention. The measured parameter often corresponds to waveform constructed from a number of data points measured in equally spaced points during one rotation of a tire (e.g., 128, 256, 512 or other number of data points per tire revolution).

A next step 604 in the method of FIG. 6 involves concatenating measured data points representing the measured uniformity parameter for the set of test tires provided in step 600. In some embodiments of the subject analysis, it may be desirable to concatenate all available data points for multiple consecutively manufactured tires, although all consecutive tires and all data points are not required in every embodiment. As such, the terms "concatenating" or "concatenated" or other forms of the word "concatenate" as used in accordance with the subject technology means the stringing or stacking together of some or all available data points for multiple tires manufactured in some known order, regardless of whether some or all data points are known or included in the concatenation. If a uniformity parameter is measured at d number of points per rotation of each tire in a test set, then a concatenated string of waveforms for n multiple tires in a test set would correspond to a waveform modeled from one long stream of n*d data points. For example, if d=512 data points are measured per tire, and such results are concatenated for n=5 consecutively built tires, then a concatenated composite waveform created in step 604 would consist of 2560 data points.

Figure 7:
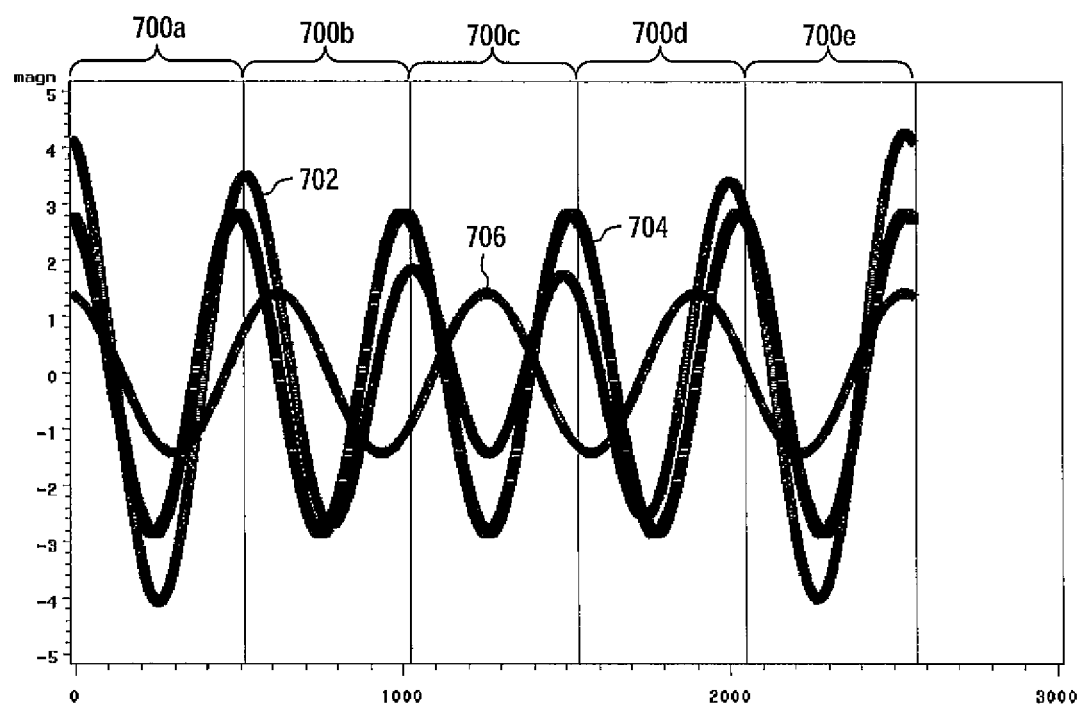
FIG. 7 is a graphical representation depicting the different contributions of both tire harmonics and process harmonics to an exemplary uniformity measurement for multiple consecutively built tires, where the ordinate represents the magnitude (magn) of the uniformity measurement measured in kilograms (kgf) and the abscissa represents the data point index (i) as measured around a tire circumference.

FIG. 7 provides a graphical representation of an exemplary concatenated waveform obtained for n=5 consecutive tires with d=512 data points measured per tire. The portion of the waveforms in section 700a of the graph represents measurements from a first tire, portion 700b a second tire, portion 700c a third tire, portion 700d a fourth tire and portion 700e a fifth tire. Waveform 702 represents a measured waveform including both tire and process effects. Waveforms 704 and 706 represent the components of the measured waveform to be separated in accordance with aspects of the disclosed technology, where waveform 704 represents the uniformity contribution due to tire effects, and waveform 706 represents the uniformity contribution due to a process effect having a frequency of introduction equal to 1.25.

Referring still to FIG. 6, an additional step 606 involves identifying at least one candidate cyclic process effect and corresponding rate of introduction. The rate of introduction for a process effect can be expressed in terms of various parameters, including but not limited to the frequency or period of introduction relative to the dimensions of the tire (e.g., tire circumference, radius, diameter, discrete number of measured data points around the tire or the like). It should be appreciated that the candidate process effects and corresponding frequencies may be identified based on certain known features of the manufacturing process, or they may be unknown. If the process effects are known, then it may be possible to identify the frequency of introduction for a process effect from certain aspects and/or conditions of the manufacturing process. If the process effects are unknown, certain candidate process effects may be identified from initial frequency analysis of the concatenated waveform established in step 604, as described later in further detail.

Referring more particularly to step 606, consider the first example in which at least some features of a candidate process effect are known. For instance, in the example discussed above relative to FIGS. 4A, 4B and 5, the roller having a periodic out-of-round contribution could be identified as the process effect which is targeted for analysis and ultimate improvement in the manufacturing process. In such example, the rate of introduction for the candidate cyclic process effect based on the roller out-of-round condition might be determined from various process conditions, such as but not limited to the speed, diameter, etc. of the tread extrusion process. Referring to the previous example, a user may be able to identify that the tire is imparting some sort of process effect every 1.25 revolutions of the tread portion. The rate or frequency of introduction can be expressed in any number of fashions either independent of the tire's dimensions (e.g., a fixed length of x meters) or dependent on the tire's dimensions in the form of a parameter such as radius, diameter, circumference or the like at one or more layered locations (e.g., every 1.5 tread revolutions, or iteration of the tire circumference), or dependent on a different dimension used to reference a tire (e.g., the number of data points measured around a tire in one rotation—128 data points, 256 data points, 512 data points, etc.)

Referring again to step 606, consider another example in which the rate of introduction of one or more process effects are unknown. Other useful methods of signal analysis may be used to analyze the concatenated waveform created in step 604 in order to identify candidate process effects and their corresponding frequencies of introduction. One exemplary method for determining frequencies of introduction for a selected number of candidate process effects involves the application of Bayesian spectral analysis techniques to the concatenated waveform of step 604. Additional aspects of such technique are presented with respect to FIG. 10.

An exemplary method for estimating frequencies for various harmonic components of a uniformity waveform, including both tire harmonics and process harmonics, is based on the premise that a uniformity waveform can be written as a sum of sine and cosine terms. For tire harmonics, the frequencies of the sine and cosine terms are integer multiples of $2\pi/N$, where N is the length of the uniformity waveform. In other words, the sines and cosines associated with tire harmonics fit an integer number of times in a single uniformity waveform. In contrast, the process harmonics that contribute to uniformity do not fit an integer number of times in a single waveform. Both the tire harmonics and the process harmonics can be estimated using Bayesian spectral analysis. In general, Bayesian spectral analysis allows for decomposition of a uniformity waveform into a sum of sine and cosine terms, where the frequencies of the sine and cosine terms are parameters to be estimated from the data. The method for estimating the frequencies in a signal with multiple frequencies is in essence a detrending method. In other words, a trend is estimated from the data then subtracted from the data. This process is iterated until the data appears to be noise.

Figure 10:
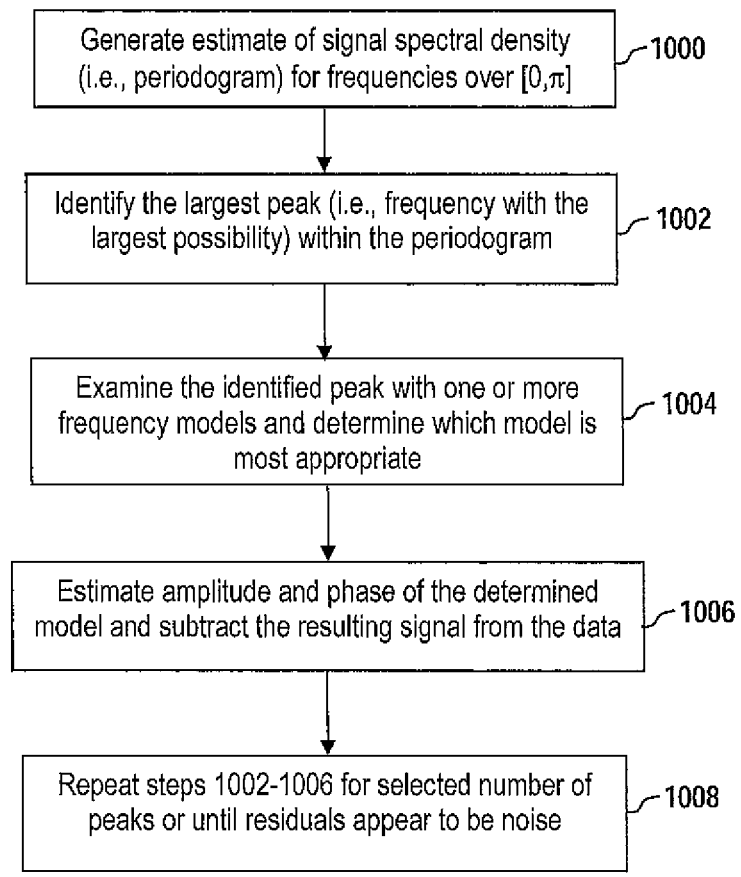
FIG. 10 provides a flow chart of exemplary steps in a process of determining one or more frequencies of introduction for process effects in a uniformity waveform.

Referring now to FIG. 10, a first exemplary step 1000 in a method of estimating frequencies for various process effects within a uniformity waveform includes generating an estimate for the signal spectral analysis (e.g., a periodogram) for all frequencies spanning the interval from $[0, \pi]$. The probability of a single frequency, w, in the data is given by the t-distribution. In this case, the t-distribution is a function of an adjusted periodogram. The periodogram is essentially the squared magnitude of the discrete Fourier transform of the data where the frequency, w, is allowed to vary continuously between 0 and $\pi$.

In step 1002, certain peaks are identified within the periodogram for subsequent analysis. The peaks within the periodogram may be identified by any one of a variety of suitable techniques, including but not limited to visual inspection and/or by comparing the amplitude of the periodogram against various threshold values. In theory, each one of these peaks should correspond to the various tire and process harmonics contributing to the overall uniformity levels within a tire.

The peak identified in step 1002 is then examined with one or more frequency models in step 1004 to determine which model is most appropriate. A one frequency model generally may be appropriate when the signal consists of frequencies that are well separated. In such instances, the frequency estimates will be located at the largest peaks in the periodogram. A multiple frequency model generally may be more appropriate if the signal contains frequencies that are close but distinct. In such cases, each large peak may be better investigated using a multiple frequency model. In one embodiment of the present technology, each peak is investigated using at least a one-frequency and a two-frequency model, although it should be appreciated that other multiple frequency models may also be used. In a one-frequency model, the t-distribution is maximized at the frequency (w) that maximizes the adjusted periodogram of the data, so the adjusted periodogram need only be maximized with respect to w in order to find the w with the largest probability. In an m-frequency model, the frequencies are estimated by maximizing the generalization of the periodogram to m frequencies. If there is evidence of multiple close frequencies, then these estimates would be used as initial estimates in a full multiple frequency analysis of the data.

In more particular embodiments of the disclosed technology, the determination in step 1004 of which model is more appropriate is made using a mathematical method known to those of ordinary skill in the art as the "odds ratio." More particularly, the odds ratio is a method for choosing between two candidate models. The odds ratio is defined as the probability of a first model I given the data and prior information divided by the probability of a second model J given the data and prior information. If the odds ratio is much larger than one, then the odds ratio indicates that model I is the better model. If the odds ratio is much smaller than one, then odds ratio indicates that model J is the better model. A value near one indicates that the models are performing substantially equally. If an assumption is made that the models are equally likely, then the odds ratio simplifies to a ratio of the probability of the data given model I to that of model J given the prior information.

Once the best model is chosen in step 1004, the magnitude and azimuth of the chosen model (either the one frequency, two frequency or other analyzed multiple frequency model) are estimated in step 1006 and the resulting signal is subtracted from the data. The process set forth in steps 1002-1006 may then be repeated as indicated per step 1008 for a selected number of peaks in the periodogram and/or until the residuals within the spectral analysis signal estimate appear to be noise. Ultimately, a selected number of peaks may be analyzed according to the techniques disclosed herein to identify multiple frequencies for the various components of a uniformity waveform. Once a sufficient number of peaks have been analyzed, the frequencies for numerous process harmonics may be identified as the frequencies having periodogram peaks, where such frequencies do not correspond to integer multiples of 2π/N.

Referring again to FIG. 6, once the different frequencies for the process harmonic(s) are identified, it is possible to separate at least one of those process harmonics from the tire harmonics in a waveform. As such, step 608 in FIG. 6 involves separating the tire harmonics from the process harmonic(s) associated with the identified candidate cyclic process. There may be several varying approaches for implementing such separation, two in particular of which will be discussed herein—a stacked Fourier analysis and a regression-based analysis.

A first exemplary manner in which to perform the process harmonic separation in step 608 involves a stacked Fourier analysis of multiple concatenated data streams. As known in the art, Fourier analysis of a signal identifies the harmonics of that signal, where a harmonic is a sinusoidal (sum of cosine and sine terms) curve that passes an exact integral number of times through the waveform. Reference herein to stacked Fourier analysis implies that data for multiple consecutively manufactured tires are provided and henced "stacked" for subsequent Fourier transformation. Consider a waveform constructed from the measured uniformity parameter at each of a number of points around the tire (e.g., 512 data points). Software can be used to calculate harmonics directly from these raw data points using Fourier transformation formulas.

If there are d=512 data points then 256 or d/2 harmonics can be calculated. The sum of these 256 harmonics will pass through each of the 512 data points. With a Fourier transformation, the rectangular components of any harmonic would be calculated as follows:

$$x = \frac{2}{d}\sum_{i=1}^{d} F_i * \cos\left(2\pi h * \left(\frac{i}{d}\right)\right) \text{ and } y = \frac{2}{d}\sum_{i=1}^{d} F_i * \sin\left(2\pi h * \left(\frac{i}{d}\right)\right),$$

where h=harmonic to estimate, d=number of data points, i=$i^{th}$ data point, and F=force at a point with average force subtracted out. From the rectangular components, the harmonic magnitude (MAG) and azimuth (AZT) would be calculated as:

$$MAG = 2\sqrt{x^2 + y^2} \text{ and } AZI = \arctan(y/x)$$

The harmonic waveform (similar to those shown in FIGS. 1B and 1C would be represented by the equation:

$$F = \frac{MAG}{2}\cos\left(2\pi h \frac{i}{d} - AZI\right).$$

When Fourier analysis is performed on a measured waveform obtained for a single tire rotation (e.g., 512 equally spaced data points around a tire circumference), then 256 different harmonics can be calculated, and all of these will be considered tire harmonics. But when Fourier analysis is performed on a measured waveform created by stacking multiple tire waveforms together (as shown in FIG. 7), then additional harmonic components including potential process effects are present. If Fourier analysis is performed on 2560 data points (512 data points for 5 consecutive tires), then 2560/2=1280 different harmonics can be calculated.

Exemplary embodiments of the subject analysis focus on a select few of these many different (e.g., 1280) harmonics calculated using the stacked Fourier transformation. For example, if concatenated data points are provided for five consecutively manufactured tires, then the first ($1^{st}$) tire harmonic passes five times through this stacked waveform and hence is the fifth ($5^{th}$) harmonic of the concatenated data stream. Similarly the $10^{th}$, $15^{th}$, and any multiple of five (5) full harmonics can be identified as the $2^{nd}$, $3^{rd}$, etc. average tire harmonics. In other words, the tire harmonics in a concatenated composite waveform of n measured tires will correspond to the $(j*n)^{th}$ harmonics for j=1, 2, . . . , d/2. This leaves the others as potential gauges of the process effects.

By knowing the frequency of introduction of a given process effect, the $m^{th}$ harmonic of the measured uniformity parameter representing the effects of such process can be identified as m=n/f. For example, with a process effect having a frequency of introduction (f) every 1.25 times the circumference of a tire, one would know that the process effect contribution would pass n/f=5/1.25=4 times through the concatenated waveform (see, e.g., waveform 706 in FIG. 7, which completes four full cycles during the 2560 data points measured across tires 1 through 5. As such, the $4^{th}$ harmonic calculated using the Fourier transformation formulas above would represent the first harmonic contribution due to the candidate process effect. Likewise, positive integer multiples of the $m^{th}$ harmonic (in this example, the $8^{th}$, $12^{th}$, etc. harmonics) represent additional contributions due to the candidate process effect. The harmonic contributions of such process effect can be represented in any number of forms, such as by the rectangular coordinates, polar coordinates or waveform representations.

Knowing the frequency of introduction of a given process effect also helps determine the number of tires (n) to measure (and subsequently analyze). Such number is dependent on the frequency of introduction (f) of the candidate process effect. When the frequency of introduction (f) is defined as a ratio relative to the tire circumference, the number of test tires (n) to measure is calculated such that n/f is approximately equal to a positive integer value. In the example with a roller process effect introduced every 1.25 revolutions of a tread portion, n=5 would be the lowest number of tires such that n/f is an integer value of four. Obviously, any multiple of five would also work for a determined n value, so it would also work to measure 10, 15, 20, etc. tires having some known order of manufacture.

A second exemplary manner in which to perform the process harmonic separation in step 608 involves slight variations to the process described above. The two main differences in this alternative method involve the number of measured data points concatenated in step 604 and the way the tire harmonics and process harmonics are separated in step 608.

Such alternative approach is similar to the above-described stacked Fourier methods in that one must have an idea of the frequency of the process effects to use variation. However, there is no requirement of stacking multiple tire waveforms in this approach. In fact, some data points may be missing, and the analysis can still proceed. However, the potential for modeling errors or reduced reliability is directly proportional to the number of points in each waveform, the number of concatenated waveforms, and the stability of other tire harmonics effects.

It should be appreciated that a full set of data points for one tire, and/or a stacked series of measurements for a set of tires manufactured in some known order, may prove helpful in yielding more accurate modeling and analysis. Indeed, the stacked Fourier analysis and the regression-based analysis should yield the same results if the same number of stacked waveforms and data points is utilized. Full sets of measurement data for multiple tires may be especially helpful in separating effects that are close in frequency. Additionally it is easier to handle varying process and tire effects as well. As such, steps 600, 602 and 604 may be the same as described above in the stacked Fourier analysis or may involve providing, measuring and concatenating data points for a fewer number of consecutively-built or non-consecutively built tires and may include only partial waveforms for the one or more measured tires.

Referring still to the alternative approach, the process harmonic contribution is separated from the contribution of the tire harmonics in step 608 via a regression-based signature analysis approach that uses known data points to fit equations such as set forth below. Each measured data point for a given tire (provided in rectangular coordinates x and y with a measurement index i) can be modeled as the sum of tire harmonics and process harmonics. For example, if 128 data points are measured around the circumference of a given tire, and each measurement is modeled as the sum of the first ten tire harmonics (T1, T2, . . . , T10) plus one process harmonic (P1) having a frequency of introduction at 1.2 times the tire circumference and one process harmonic (P2) having a frequency of introduction at 1.6 times the tire circumference, then the following equations are fitted using regression analysis techniques. The following equations can then be solved to produce estimates of the magnitude and azimuth for T1, T2, . . . , T10, P1 and P2, for example by using matrix algebra, since the measured data points and index values are known. Once the equations are solved to determine the T1, T2, . . . , T10, P1, P2, etc. coefficients, the rectangular coordinates for other data points can be estimated. It should be appreciated that similar formulas can be used if data points are available for multiple tires.

$$x_i = T1^*\cos(2\pi^*1^*i/128) - T1^*\sin(2\pi^*1^*i/128) + T2^*\cos(2\pi^*2^*i/128) - T2^*\sin(2\pi^*2^*i/128) + T3^*\cos(2\pi^*3^*i/128) - T3^*\sin(2\pi^*3^*i/128) + T4^*\cos(2\pi^*4^*i/128) - T1^*\sin(2\pi^*4^*i/128) + T5^*\cos(2\pi^*5^*i/128) - T5^*\sin(2\pi^*5^*i/128) + T6^*\cos(2\pi^*6^*i/128) - T6^*\sin(2\pi^*6^*i/128) + T7^*\cos(2\pi^*7^*i/128) - T7^*\sin(2\pi^*7^*i/128) + T8^*\cos(2\pi^*8^*i/128) - T8^*\sin(2\pi^*8^*i/128) + T9^*\cos(2\pi^*9^*i/128) - T9^*\sin(2\pi^*9^*i/128) + T10^*\cos(2\pi^*10^*i/128) - T10^*\sin(2\pi^*10^*i/128) + P1^*\cos(2\pi^*1.2^*i/128) - P1^*\sin(2\pi^*1.2^*i/128) + P2^*\cos(2\pi^*1.6^*i/128) - P2^*\sin(2\pi^*1.6^*i/128)$$

$$y_i = T1^*\cos(2\pi^*1^*i/128) + T1^*\sin(2\pi^*1^*i/128) + T2^*\cos(2\pi^*2^*i/128) + T2^*\sin(2\pi^*2^*i/128) + T3^*\cos(2\pi^*3^*i/128) + T3^*\sin(2\pi^*3^*i/128) + T4^*\cos(2\pi^*4^*i/128) + T1^*\sin(2\pi^*4^*i/128) + T5^*\cos(2\pi^*5^*i/128) + T5^*\sin(2\pi^*5^*i/128) + T6^*\cos(2\pi^*6^*i/128) + T6^*\sin(2\pi^*6^*i/128) + T7^*\cos(2\pi^*7^*i/128) + T7^*\sin(2\pi^*7^*i/128) + T8^*\cos(2\pi^*8^*i/128) + T8^*\sin(2\pi^*8^*i/128) + T9^*\cos(2\pi^*9^*i/128) + T9^*\sin(2\pi^*9^*i/128) + T10^*\cos(2\pi^*10^*i/128) + T10^*\sin(2\pi^*10^*i/128) + P1^*\cos(2\pi^*1.2^*i/128) + P1^*\sin(2\pi^*1.2^*i/128) + P2^*\cos(2\pi^*1.6^*i/128) + P2^*\sin(2\pi^*1.6^*i/128)$$

Referring again to FIG. 6, a next step 610 involves filtering the uniformity measurements to remove or reduce the effects of the process harmonic(s). For example, given the estimate of a process harmonic for each tire, it is possible to re-estimate the tire harmonics to make the measurements less affected by the data shifts caused by the process effects. In software implementation, the filtering step 610 can be performed separately from step 608 or as part of the extraction of the process harmonic from the tire harmonics. The extracted information (i.e., the process harmonic contribution) and/or the filtered tire harmonic information can then be provided as output to a user for subsequent analysis, including the provision of tire evaluation data via visual or graphical displays, the implementation of tire sorting to fit within certain customer performance limits, etc.

Following through with the example above where the out-of-round roller process effect is identified as the $4^{th}$ harmonic in a concatenated waveform of data from five tires, the original measurements can be filtered to remove such process effects contributed by the calculated $4^{th}$ harmonic value. For example, a measured waveform can be modified such that it is represented by the sum of all harmonics minus the $4^{th}$ harmonic which was identified as an estimated contribution due to the out-of-round roller process effect.

It should be appreciated that the above analysis works better if certain assumptions about a candidate process effect are met. For example, the process effect cannot have the same period as a tire effect, or the two will become entangled in the analysis and the Fourier results will indicate the tire harmonics as a sum of tire plus process effects without getting the desired separation of process and tire harmonics. In addition, since the tire harmonics are only fitted as average effects the process should be as stable as possible and the impacts of other process variables contributing to uniformity variations should be minimized.

It should be further appreciated that the approach of FIG. 6 can be used for multiple simultaneous process signatures, as long as it is possible to choose an appropriate number of tires to exactly break the tire and process effects apart. For example, process effects of 1.25 and 1.66 tire circumferences could be handled by stacking five (5) consecutive tire waveforms but effects at 1.3 and 1.5 would require thirty-nine (39) stacked tires. Additional process effects may require the provision and measurement of multiple consecutively built tires to determine respective contributions of multiple process effects.

After the tire harmonics and the process harmonics are identified and separated in step 608 (and optionally used to filter the tire harmonics of a uniformity measurement in step 610), a final step 612 involves building new tires with altered manufacturing steps or features to account for the process effects. An improved manufacturing process implemented in accordance with step 612 ultimately reduces uniformity dispersion and increases customer yields (i.e., the number of tires having acceptable uniformity limits).

In one example, an altered manufacturing step may involve altering the location of a process effect relative to other tire components (e.g., those creating the tire harmonics—joint overlap locations, press effects, etc.) so that the combined average magnitude of the tire and process effects (determined by vector algebra) is smaller or negligible, thus compensating for the existence of a process effect. Such an alteration may be facilitated by adding a sensor in the tire manufacturing system that marked the position of the roller in each tire build. Alternatively, the roller could be repositioned in the same location for each tire. Knowing the roller position relative to its identified out-of-round condition can then be used to easily correct values measured in a process of analyzing and accounting for tire non-uniformities. The addition of an identified constant vector from the out-of-round condition could then be corrected by the positioning of another process element. An example of how this vector compensation would work is depicted in FIGS. 8 and 9.

Figure 8A:
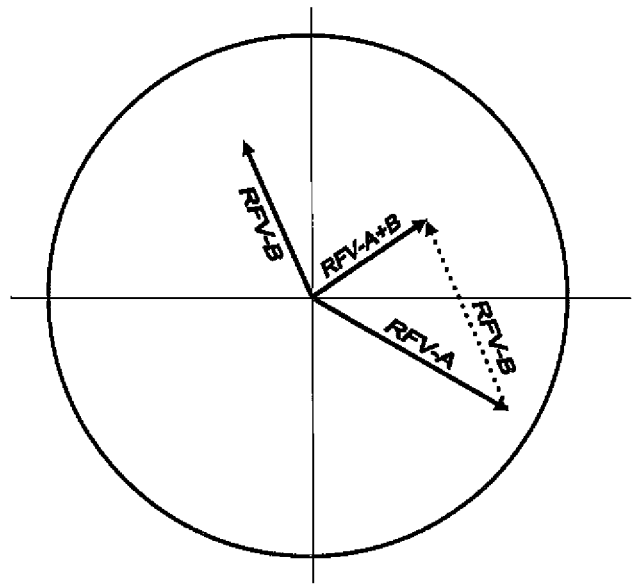
FIG. 8A is a vector plot of resultant radial force variation due to exemplary process elements A and B provided in respective original locations.
Figure 8B:
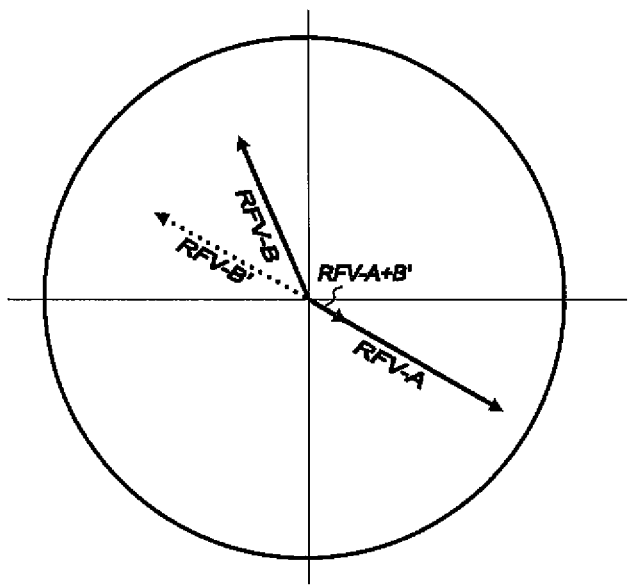
FIG. 8B is a vector plot of radial force variation due to exemplary process elements A and B provided in respective selectively rotated locations.
Figure 9:
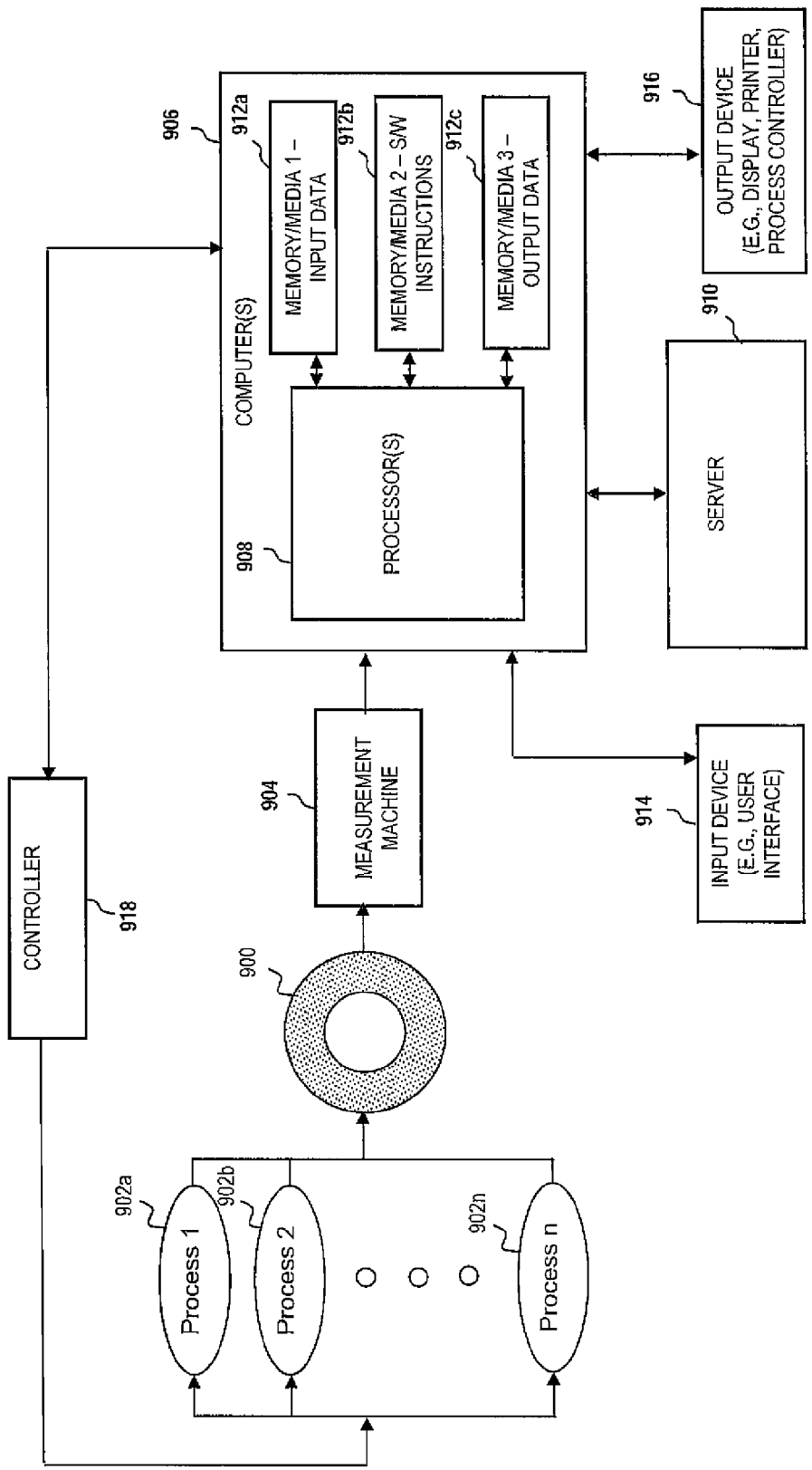
FIG. 9 is a block diagram of exemplary hardware components in a system of the present invention, including various exemplary tire manufacturing, measurement, and post-measurement computer processing components.

FIG. 8 illustrates through vector algebra how a measured uniformity parameter (e.g., radial force variation (RFV) can be represented as the sum of respective contributions RFV-A and RFV-B. If RFV-A and RFV-B represent the respective contributions from a tire harmonic contribution (e.g., a press location) and a process harmonic contribution (e.g., an out-of-round roller condition), and the relative angular locations of such elements A and B are known, it is possible to optimize the overall radial force variation by selectively rotating the location of each of the process elements A and B. So, for example, as shown in FIG. 9, if process element A remains the same but process element B is rotated to a new location represented as vector RFV-B', then the two vector contributions of RFV-A and RFV-B' will add to yield new total vector RFV-A+B'. Comparing the magnitude of the new average vector RFV-A+B' in FIG. 9 to the original RFV-A+B vector from FIG. 8, one can see that it is possible to reduce the magnitude of the mean RFV value over a set of test tires.

In another example of a potential modification to the tire building process in step 612 of FIG. 6, the process effect itself is altered to reduce or remove its effects. For example, an identified out-of-round condition can be corrected to reduce the dispersion if this process effect were still randomly added into each tire. Even when process effects are only reduced as opposed to removed, the cost of correcting tire uniformity will be reduced. For example, rectification procedures such as grinding the tread surface to improve tire uniformity will be implemented less often and in reduced quantities when required.

In a still further example, the manufacturing process can be adjusted to be robust to the anticipated and identified process effects. For example, uniformity dispersion might rise due to a periodic introduction of temperature variation. One could choose to fix the problem by installing an air-conditioning system in the manufacturing environment. Instead, it might be possible to set the conditions of the building process to work well under all temperatures, even if this is not the best that could be done under an ideal temperature. Since yield is often harmed more by instability and dispersion, this robust (to temperature) process could produce better yield than the perfect process which is never achieved. The robust process or design approach is often a quick, relatively easy way to improve processes without spending money or using resources.

EXAMPLE

To better appreciate the process illustrated in FIG. 6 and described above, a numerical example of process effect evaluation is presented based on simulated results. The results below provide simulated data (i.e., test results for hypothetical tires), but exemplify the types of improvements in uniformity achieved from applying the subject analysis to actual manufactured tires. Table 1 below provides a set of simulated uniformity waveform data where radial force (VR) is measured for n=5 tires having some known manufacturing order. For simplicity, the number of data points measured in step 602 around the circumference of each tire is x=4.

A candidate process effect is identified in step 606 as an out-of-round roller with a circumference that is 1.25 times the circumference of the tire on which it is being used. Steps 602 and 604 involve collecting the measurement data and stringing it together into one long waveform plotted using the data in Table 1.

TABLE 1

Simulated Measurement Data for Five Exemplary Tires

| TIRE # | TIRE INDEX | CONCATENATED INDEX | VR POINT VALUE |
|---|---|---|---|
| 1 | 1 | 1 | −0.535 |
| 1 | 2 | 2 | −4.057 |
| 1 | 3 | 3 | −0.271 |
| 1 | 4 | 4 | 3.487 |
| 2 | 1 | 5 | 0.725 |
| 2 | 2 | 6 | −2.637 |
| 2 | 3 | 7 | −0.654 |
| 2 | 4 | 8 | 1.830 |
| 3 | 1 | 9 | 0.084 |
| 3 | 2 | 10 | −1.376 |
| 3 | 3 | 11 | 0.767 |
| 3 | 4 | 12 | 1.448 |
| 4 | 1 | 13 | −1.573 |
| 4 | 2 | 14 | −2.018 |
| 4 | 3 | 15 | 2.027 |
| 4 | 4 | 16 | 2.868 |
| 5 | 1 | 17 | −1.956 |
| 5 | 2 | 18 | −3.674 |
| 5 | 3 | 19 | 1.386 |
| 5 | 4 | 20 | 4.129 |

In this example, one exemplary embodiment of step 608 in FIG. 6 would consist of using the multiple regression techniques to analyze the set of data points in Table 1 as the dependent variable versus a set of tire harmonics (only one in this example, for sake of simplicity) and process signatures (also one in this case with a frequency of introduction of 1.25 times the tire circumference or diameter). Specifically, the terms of the regression analysis described in the prior formulas are modified in this example to be $\cos(2*\pi*(\text{concatenated index})/4)$ and $\sin(2*\pi*(\text{concatenated index})/4)$ for the average $1^{st}$ tire harmonic and $\cos(1.25*2*\pi(\text{concatenated index})/4)$ and $\sin(1.25*2*\pi(\text{concatenated index})/4)$ for the process signature effect. The results of this regression analysis are that the process signature vector has a magnitude of about 2.82 at a relative azimuth of about 347 degrees.

Continuing to step 610, one may compare the regression estimates of the tire harmonics without the process signature being removed (naïve data) to the values of these quantities when it is removed (corrected data), as shown in Table 2 below. Since the process harmonic often expresses itself as dispersion from tire to tire, this corrected value should be closer to the true tire harmonic value. Table 2 shows a comparison of naïve and filtered values for some hypothetical individual tire VRH1 values. The average of the four naïve magnitudes is 5.93 which is close to the corrected value of 5.65 and has a standard deviation of 2.23 which has shrunk to zero for the corrected values. In this example, all variation due to the shifting process signature has been removed.

TABLE 2

Simulated Measured Versus Filtered Data

| NAÏVE MAGNITUDE | NAÏVE AZIMUTH | CORRECTED MAGNITUDE | CORRECTED AZIMUTH |
|---|---|---|---|
| 7.54 | 358 | 5.65 | 347 |
| 4.46 | 17 | 5.65 | 347 |
| 2.82 | 347 | 5.65 | 347 |
| 4.88 | 324 | 5.65 | 347 |
| 7.80 | 337 | 5.65 | 347 |

Finally, step 612 involves using the information about the signature of the process element (i.e., the roller) to reduce uniformity variations for future tire constructions. Some different available options have already been discussed above.

Referring now to FIG. 9, a schematic overview of exemplary hardware components for implementing the above-described methodology is illustrated. An exemplary tire 900 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 902a, 902b, . . . , 902n in FIG. 9 and combine to form exemplary tire 900. At least one of the process elements 902 may represent the candidate process effect that is identified for analysis in accordance with the subject methods. It should be appreciated that a batch of multiple tires may be constructed from one iteration of the various processes 902a through 902n. Often, it is such a batch of multiple tires that are measured and tested in accordance with the disclosed uniformity improvement techniques. The multiple model tires are then analyzed to improve the tire building process for subsequently manufactured tires.

Referring still to FIG. 9, a measurement machine 904 is provided to obtain the various uniformity measurements obtained in step 602 of FIG. 6. In general, such a measurement machine may include such features as a mounting fixture on which a tire is mounted and rotated centrifugally at one or more predetermined speeds. In one example, laser sensors are employed to operate by contact, non-contact or near contact positioning relative to tire 900 in order to determine the relative position of the tire surface at multiple data points (e.g., 128 points) as it rotates about a center line. It should be appreciated that any suitable measurement machine capable of obtaining uniformity measurements, such as but not limited to RRO, LRO, RFV, TFV, LFV, balance and the like may be utilized.

The measurements obtained by measurement machine 904 may be relayed to one or more computers 906, which may respectively contain one or more processors 908, although only one computer and processor are shown in FIG. 9 for ease and clarity of illustration. Processor(s) 908 may be configured to receive input data including raw measurements of tire parameters, analyze such measurements in accordance with the disclosed harmonic separation and filtering techniques, and provide useable output such as data to a user or signals to a process controller. Uniformity analysis may alternatively be implemented by one or more servers 910 or across multiple computing and processing devices.

Various memory/media elements 912 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 9 shows three separate memory/media elements 912a, 912b and 912c, the content dedicated to such devices may actually be stored in one memory/media element or in multiple elements. Any such possible variations and other variations of data storage will be appreciated by one of ordinary skill in the art.

The computing/processing devices of FIG. 9 may be adapted to function as a special-purpose machine providing desired functionality by accessing software instructions rendered in a computer-readable form stored in one or more of the memory/media elements (e.g., memory/media element 912b). When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Other memory/media elements (e.g., memory/media elements 912a, 912c) are used to store data which will also be accessible by the processor(s) 908 and which will be acted on per the software instructions stored in memory/media element 912b. For example, memory/media element 912a may include input data corresponding to measured composite waveforms obtained from the measurement machine 904 as well as any predetermined tire parameters, such as but not limited to tire radius, tire width, tire summit mass, tire pressure, tire radial stiffness, tire tangential stiffness, tire bending stiffness, tire extensional stiffness, tread locations, general tire data and the like. Such predetermined parameters may be pre-programmed into memory/media element 912a or provided for storage therein when entered as input data from a user accessing the input device 914.

Input device 914 may correspond to one or more peripheral devices configured to operate as a user interface with computer 906. Exemplary input devices may include but are not limited to a keyboard, touch-screen monitor, microphone, mouse and the like.

Second memory element 912b includes computer-executable software instructions that can be read and executed by processor(s) 908 to act on the input data stored in memory/media element 912a to create new output data (e.g., filtered tire harmonic waveforms, extracted process effect contributions, etc.) for storage in a third memory/media element 912c. Selected portions of the output data may then be provided to one or more peripheral output devices 916.

Output device 916 may correspond to a display such as a monitor, screen, or other visual display, a printer, or the like. Another specific form of output device may correspond to a process controller 918. In one embodiment, controller 918 assists the overall tire manufacturing process by coordinating changes to the process elements 902a, 902b, . . . , 902n that are optimized in accordance with the disclosed processing analysis. For example, uniformity analysis conducted by computer 906 may determine an optimum arrangement for the angular locations of process elements (e.g., product joint locations, curing press position, etc.) contributing to tire harmonics that will help compensate for a periodically introduced process harmonic. These angular locations are provided as output to the controller 918, which is coupled back to the processes 902a, 902b, . . . , 902n in order to implement the determined optimum arrangement of process element angular locations.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for improving the uniformity of tires in tire manufacture, comprising:

providing a set of test tires manufactured in a known order;

identifying at least one candidate cyclic process effect and a corresponding rate of introduction of the at least one candidate cyclic process effect, the at least one candidate cyclic process effect having a period that does not fit an integer number of times within a tire circumference associated with the set of test tires;

measuring a given uniformity parameter for each tire in the set of test tires, wherein the measured uniformity parameter contains one or more tire harmonics and process harmonics;

concatenating measured data points for the set of test tires into a concatenated composite waveform;

separating at least one process harmonic associated with each of the at least one candidate cyclic process effects from the tire harmonics in the concatenated composite waveform; and building a new tire to improve uniformity based on knowledge of each separated process harmonic.

2. The method of claim 1, wherein the number of tires in the set of test tires is such that the number of tires (n) divided by the rate of introduction corresponding to a frequency of introduction (f) of the at least one candidate cyclic process effect is a positive integer number.

3. The method of claim 2, wherein said at least one process harmonic is separated by identifying at least one positive integer multiple of the mth harmonic of the measured uniformity parameter, where m is equal to the number of tires (n) in the measured test set divided by the frequency of introduction (j) of the at least one candidate cyclic process effect.

4. The method of claim 1, wherein said step of separating at least one process harmonic from the tire harmonics comprises applying Fourier transformation to the concatenated composite waveform to identify a plurality of harmonics.

5. The method of claim 1, wherein said step of separating at least one process harmonic from the tire harmonics comprises applying a regression-based analysis to the data points forming the concatenated composite waveform.

6. The method of claim 1, wherein the given uniformity parameter measured for each tire comprises one or more of radial run out (RRO), lateral run out (LRO), mass variance, balance, radial force variation (RFV), lateral force variation (LFV) and tangential force variation (TFV).

7. The method of claim 1, wherein said step of building a new tire to improve uniformity comprises altering the angular location of material components contributing to tire effects relative to the at least one candidate cyclic process effect to reduce the combined average magnitude of the tire and process effects.

8. The method of claim 7, wherein the material components contributing to tire effects correspond to a start point or joint overlap location for one or more of casing textile plies, belt plies, bead rings, inner liner, tread and other rubber layers of the tires, the location at which a green tire is placed onto a building drum, or the location at which a green tire is placed into a press.

9. The method of claim 1, wherein said step of building a new tire to improve uniformity further comprises positioning a sensor to track the location of each introduction of the at least one candidate cyclic process effect in manufactured tires.

10. The method of claim 1, further comprising a step of filtering the measured given uniformity parameter to remove the contribution from the separated process harmonic and providing the filtered measurements as output to a user.

11. The method of claim 1, wherein the rate of introduction corresponding to the at least one candidate cyclic process effect is identified from known process conditions.

12. The method of claim 1, wherein the rate of introduction corresponding to the at least one candidate cyclic process effect is identified from performing spectral analysis of the concatenated composite waveform.

13. A system for improving the uniformity of tires in tire manufacture, comprising:

a first memory adapted for storing a plurality of concatenated data points for at least one measured uniformity parameter for a set of test tires manufactured in a known order, wherein the at least one measured uniformity parameter includes one or more tire harmonics and process harmonics;

a second memory adapted for storing software in the form of computer-executable instructions; and at least one processor coupled to said first and second memories and configured to selectively implement the computer-executable instructions stored in the second memory to analyze the concatenated data points stored in the first memory;

wherein said at least one processor implements the computer-executable instructions stored in said second memory in order to separate at least one process harmonic associated with at least one candidate cyclic process effect having a corresponding identified frequency of introduction from the tire harmonics in a composite waveform formed from the plurality of concatenated data points, the at least one candidate cyclic process effect having a period that does not fit an integer number of times within a tire circumference associated with the set of test tires.

14. The system of claim 13, wherein the plurality of concatenated data points whose information is stored in said first memory comprises data measured for a set of test tires having a number of tires (n) such that when n is divided by the identified frequency of introduction (j) of the at least one candidate cyclic process effect, the result is approximately equal to a positive integer number.

15. The system of claim 13, wherein said at least one processor is more particularly configured to separate the at least one process harmonic from the tire harmonics by applying Fourier transformation to the concatenated data points stored in said first memory.

16. The system of claim 13, wherein said at least one processor is more particularly configured to separate the at least one process harmonic from the tire harmonics by applying a regression-based analysis to the concatenated data points.

17. The system of claim 13, wherein the frequency of introduction corresponding to the at least one candidate cyclic process effect is identified from known process conditions.

18. The system of claim 13, wherein the frequency of introduction corresponding to the at least one candidate cyclic process effect is identified from performing spectral analysis of the concatenated composite waveform.

19. The system of claim 13, further comprising a measurement machine onto which a plurality of test tires are mounted and rotated to obtain the one or more measured uniformity parameters, and wherein said measurement machine is capable of measuring one or more of radial run out (RRO), lateral run out (LRO), mass variance, balance, radial force variation (RFV), lateral force variation (LFT) and tangential force variation (TFV).

20. The system of claim 13, further comprising a controller communicatively coupled to said processor for receiving output data representative of the at least one process harmonic and the tire harmonics, and wherein said controller is coupled to a tire construction system to build a new tire that improves uniformity by altering the angular location of material components contributing to the tire effects relative to the process effect.

* * * * *